United States Patent [19]

Hirose

[11] Patent Number: 4,744,553

[45] Date of Patent: May 17, 1988

[54] DOCUMENT CONVEYING SYSTEM

[75] Inventor: Akira Hirose, Tokyo, Japan

[73] Assignee: Ricoh Company, Ltd., Tokyo, Japan

[21] Appl. No.: 8,070

[22] Filed: Jan. 22, 1987

Related U.S. Application Data

[63] Continuation of Ser. No. 774,355, Sep. 10, 1985, abandoned.

[30] Foreign Application Priority Data

Sep. 18, 1984 [JP] Japan .................................. 59-193987
Sep. 27, 1984 [JP] Japan .................................. 59-200597

[51] Int. Cl.⁴ ........................ B65H 5/22; B65H 29/66; G03B 27/32
[52] U.S. Cl. ........................................ 271/3.1; 271/65; 271/186; 355/23
[58] Field of Search .................. 271/3.1, 65, 184, 185, 271/186, 218, 225, 275, 301, 902; 355/23, 24, 3 SH, 14 SH

[56] References Cited

U.S. PATENT DOCUMENTS

| | | | |
|---|---|---|---|
| 4,269,406 | 5/1981 | Hamlin | 271/3.1 |
| 4,278,344 | 7/1981 | Samay | 355/23 X |
| 4,319,833 | 3/1982 | Hidding | 271/3.1 |
| 4,391,504 | 7/1983 | Acquaviva | 271/3.1 |
| 4,419,007 | 12/1983 | Kingsley | 271/3.1 |
| 4,433,836 | 2/1984 | Kulpa et al. | 271/3.1 |
| 4,456,237 | 6/1984 | Buddendeck | 271/3.1 |
| 4,457,506 | 7/1984 | Ashbee et al. | 271/3.1 |
| 4,469,319 | 9/1984 | Robb et al. | 271/3.1 |
| 4,512,651 | 4/1985 | Dunleavy, Jr. | 271/3.1 X |

Primary Examiner—Andres Kashnikow
Assistant Examiner—Robert J. Oberleitner
Attorney, Agent, or Firm—Cooper & Dunham

[57] ABSTRACT

A document conveying system suitable for use with a copying apparatus, printer, etc., including a document storage section located above a document illuminating section. Documents supported in a stack in the document storage section are fed one by one through a forward portion of the document storage section and have their direction of movement altered so as to move in an opposite direction. The direction of movement is altered again to move them the same direction as when fed from the document storage section, so that each document can be illuminatingly scanned in the document illuminating section. After being illuminatingly scanned, the documents are conveyed and have their direction of movement altered again, to be returned to the document storage section in a direction opposite the direction in which they were initially fed from the document storage section.

8 Claims, 3 Drawing Sheets

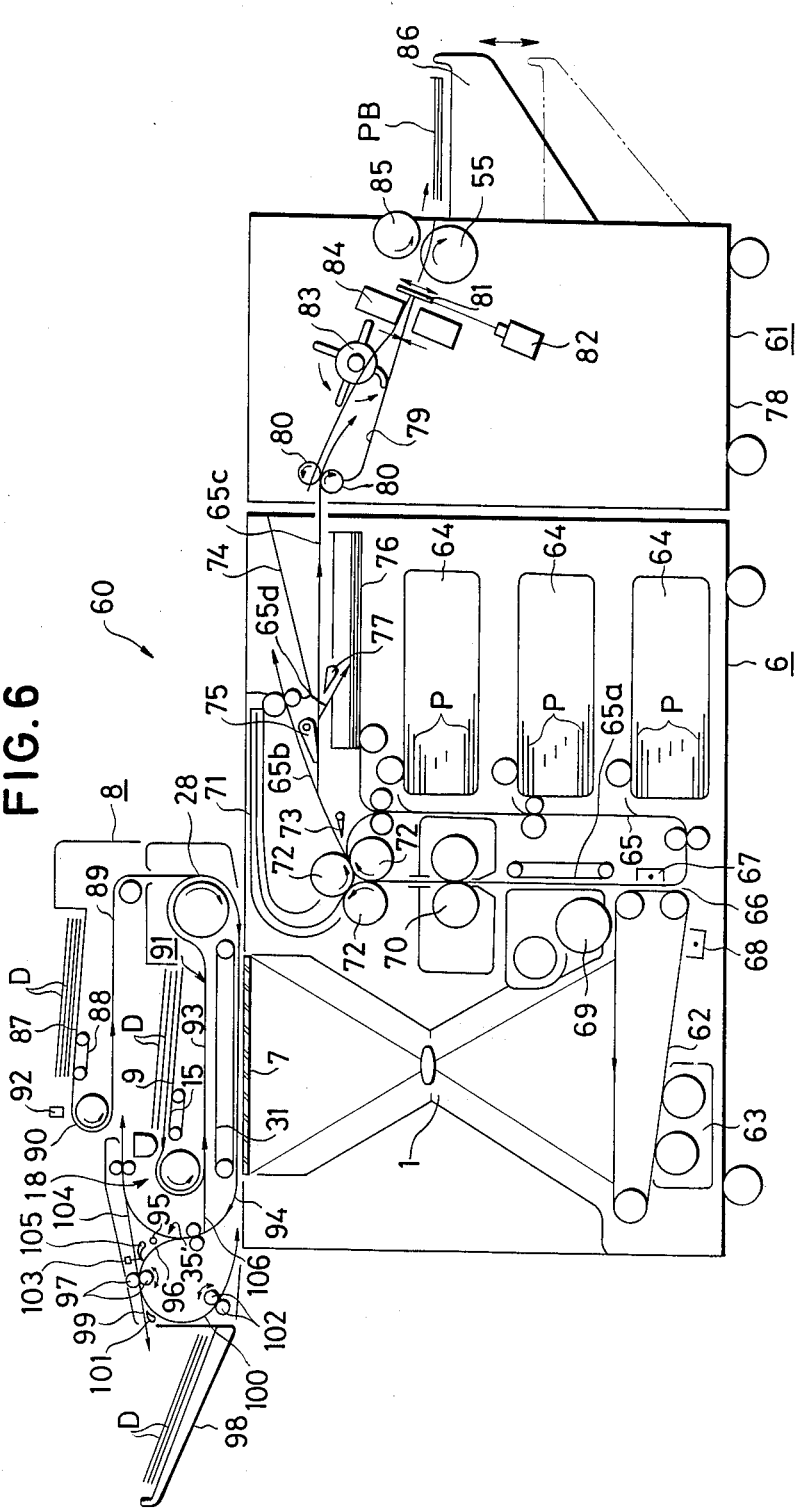

DOCUMENT CONVEYING SYSTEM

This is a continuation of application Ser. No. 774,355 filed Sept. 10, 1985, now abandoned.

FIELD OF THE INVENTION

This invention relates to a document conveying system for conveying a document set in a document storage section to a document illuminating section and feeding the document to the document storage section again after it is illuminated.

BRIEF DESCRIPTION OF THE DRAWINGS

FIG. 6 is a schematic view of a copying apparatus incorporating therein the document conveying system comprising another embodiment of the invention.

DESCRIPTION OF THE PRIOR ART

Figure 1:
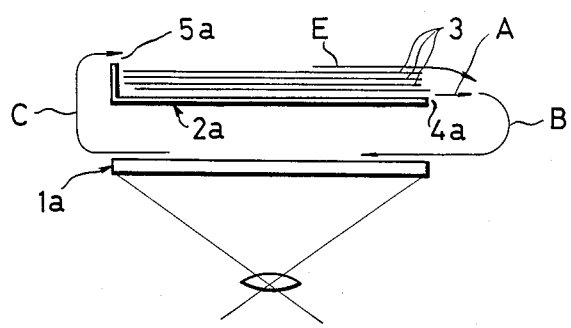
FIGS. 1-4 are views in explanation of document conveying systems of the prior art.

When duplicates of a plurality of documents in sheet form are produced by means of an electrophotographic copying apparatus, it is inconvenient to set each document on a contact glass member and then place a pressure plate thereon and remove the pressure plate after the document is illuminated to expose a photosensitive member to an optical image of the document to allow the document to be replaced by a new one. To obviate this, the present tendency is to adopt an automatic document conveying system in which one sheet after another is fed automatically from a document tray to an exposing section and each document is automatically ejected from the exposing section after the document is illuminated to expose the photosensitive member to an optical image of the document.

When a set of documents in sheet form having a multiplicity of pages are copied to produce a plurality of sets of documents, it has hitherto been usual practice to set each document on the contact glass member one after another and a predetermined copying operation is performed by the copying apparatus on the document to produce a required number of duplicates of the document, with the process being followed a number of times corresponding to the number of documents of the set. The duplicates of the documents thus produced are ejected from the copying apparatus and manually handled by the operator or fed to a sorter to arrange the duplicates in the order of pages to produce the required number of sets of duplicates with the pages of the duplicates of each set being arranged in proper order.

When a sorter is used to automatically arrange the pages of the duplicates in proper order, duplicates of different copying conditions would be fed to the bins of the sorter in the event that a plurality of sets of documents of different copying conditions are handled, making it necessary to remove the duplicates from the bins to reclassify the duplicates. Reclassifying the duplicates is a troublesome operation, making it impossible to produce the required number of sets of duplicates at high speed.

To obviate the aforesaid disadvantage suffered by the practice of consecutively producing a required number of duplicates of each document of a set of plurality of documents one after another and arranging the pages of the duplicates in proper order so as to produce the required number of sets of the duplicates by using a sorter, proposals have hitherto been made to adopt a document circulating conveying system in which each document fed from a document tray is returned to the document tray each time it has been illuminated to expose a photosensitive member to an optical image of the document so that one set of duplicates of the documents after another is produced and bound by using a finisher cooperating with the system. The document circulating conveying system is capable of reducing the time required for performing the operation of arranging the pages of the duplicates of the documents in proper order by means of a sorter.

However, in the document circulating conveying system described hereinabove, when there are two sets of documents of different copying conditions to be handled, it is necessary that the next following set of documents be fed to the document tray only after the preceding set of documents has been copied. This, the time during which the operator has to attend to the copying apparatus would be prolonged.

The document circulating conveying system may be set in such a manner as to allow a copying operation to be performed by feeding all the sets of documents of different copying conditions to the document tray together. However, when a copying operation is performed by feeding documents of different copying conditions together to the document tray, it becomes necessary to move all the documents of different copying conditions in circulation a number of times corresponding to the number of times the documents required to produce a maximum number of duplicates are circulated. Thus, those documents which require a small number of duplicates would have to move in circulation without being illuminated to expose the photosensitive member to their optical images. This would damage the documents and cause a loss of time.

Examples of the document circulating conveying system of the prior art will be outlined by referring to the accompanying drawings. Referring to FIG. 1, there is shown a basic construction of the document circulating conveying system in which documents 3 are set in a document storage section 2a located above a document illuminating section 1a. A document is fed from the document storage section 2a through a document feeding port 4a in the direction of an arrow A. The direction in which the document is conveyed is altered as indicated at B before the document is fed into the document illuminating section 1a. After being illuminated, the document in the document illuminating section 1a is conveyed therefrom in the direction of an arrow C and returned to the document storage section 2a through a document return port 5a. This construction is most common for this type of system. However, in the system of the construction shown in FIG. 1, the arrangement whereby the document feeding port 4a and document return port 5a are located on opposite ends of the document storage section 2a makes it necessary, when the documents handled are small in size, to displace the document return port 5a toward the document feeding port 4a as indicated by an arrow D in FIG. 2 so that the leading ends of the documents can be brought into alignment with each other when they are fed to the document storage section 2a. Thus, the operator is forced to take necessary steps each time the documents to be copied differ from each other in size, making the copying operation less convenient.

Figure 2:
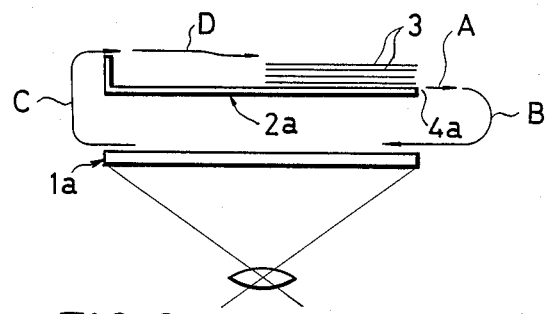

In a system of the construction shown in FIGS. 1 and 2 there is a risk that the document returned to the document storage section 2a after being illuminated in the document illuminating section 1a might be fed again from the document storage section 2a prior to the documents to be handled yet, as indicated by an arrow E in FIG. 1.

Figure 3:
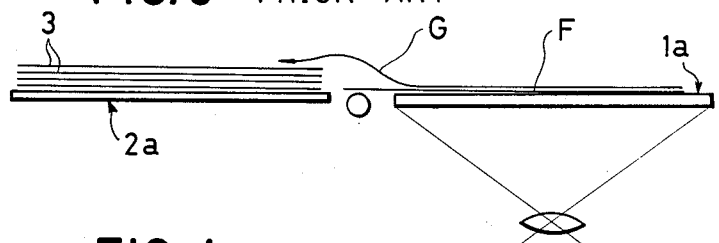
Figure 4:
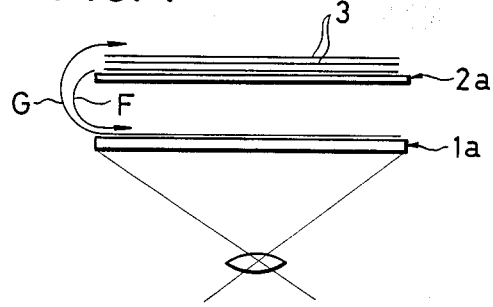

To obviate the aforesaid disadvantages, proposals have been made to use a construction in which, as shown in FIG. 3, the document storage section 2a is located not above the document illuminating section 1a but in side-by-side relation thereto. In this construction, the document 3 is fed from the document storage section 2a in the direction of an arrow F and returned, after it is illuminated, to the document storage section 2a by being conveyed in a direction indicated by an arrow G which is opposite the direction indicated by the arrow F. In the system of the construction described hereinabove, the document 3 is conveyed, when it is returned to the document storage section 2a, in a direction opposite the direction in which it is conveyed when it is fed from the document storage section 2a to the document illuminating section 1a. This makes it necessary to feed the next following document from the document storage section 2a to the document illuminating section 1a after the preceding document has been conveyed to the document illuminating section 1a and returned to the document storage section 2a after being illuminated, with the result that the time required for handling one document is prolonged and it becomes impossible to handle a plurality of documents in a short period of time. The document circulating conveying system constructed as shown in FIG. 4 in which the document 3 is fed in the direction of an arrow F from the document storage section 2 located above the document illuminating section 1a and returned in the direction of the arrow G opposite the direction of the arrow F to the document storage section 2a after being illuminated is also known. But the system shown in FIG. 4 suffers the same disadvantage that is suffered by the system shown in FIG. 3.

SUMMARY OF THE INVENTION

This invention has as its object the provision of a document conveying system which is simple in construction and yet capable of eliminating the aforesaid disadvantages of the prior art.

According to the invention, there is provided a document conveying system comprising a document storage section located above a document illuminating section, said document storage section being capable of supporting a plurality of documents set therein, first direction altering means for altering the direction in which a document fed from said document storage section through a document feeding port is conveyed so that it will be conveyed above said document illuminating section from one end thereof toward an opposite end thereof, second direction altering means for altering the direction in which the document is conveyed so that it will be conveyed again to the document illuminating section from the opposite end thereof toward the one end thereof, and third direction altering means for altering the direction in which the document is conveyed after being illuminatingly scanned in the document illuminating section so that it will face a document return port located on the same side as the document feeding port and be returned to the document storage section.

The document conveying system according to the invention enables a plurality of sets of documents of different copying conditions to be copied with a high degree of efficiency while reducing the time during which the operator has to operate to the copying apparatus.

According to the invention, there if also provided a document conveying system comprising a first document tray capable of containing simultaneously a plurality of sets of documents of different copying conditions, a second document tray for receiving one set of documents after another from the first document tray to allow them to be subjected to recycling copying, a document ejection tray for receiving the documents after being copied, and a plurality of document passageways connecting said trays together and allowing the documents to be convey4ed by reversing the direction in which they are conveyed.

In the document conveying system according to the invention, the document feeding port for feeding the document from the document storage section to the document illuminating section and the document return port for returning the document from the documenht illuminating section to the document storage section are located on the same side, thereby eliminating the need to adjust the position of the document return port in accordance with the size of the document. Since the document is not conveyed, after being illuminated, in a direction opposite the direction in which it is fed, it is possible to consecutively feed the documents from the document setting section to the document illuminating section and shorten the time required for handling the documents.

As described hereinabove, the document conveying system according to the invention comprises a first document tray capable of containing simultaneously a plurality of sets of documents of different copying conditions, a second document tray for receiving one set of documents after another from the first document tray to allow them to be. subjected to recycling copying, a document ejection tray for receiving the documents after being illuminated, and a plurality of document passageways connecting said trays together and allowing the documents to be conveyed by reversing the direction in which they are conveyed, it is possible to allow a plurality of documents of different copying conditions to be copied with a high degree of efficiency merely by placing them on the first document tray and the time during which the operator is engaged in actually operating the copying apparatus can be reduced.

DESCRIPTION OF THE PREFERRED EMBODIMENTS

The invention will now be described by referring to embodiments thereof which are each incorporated in an electrophotographic copying apparatus as a document conveying system thereof.

Figure 5:
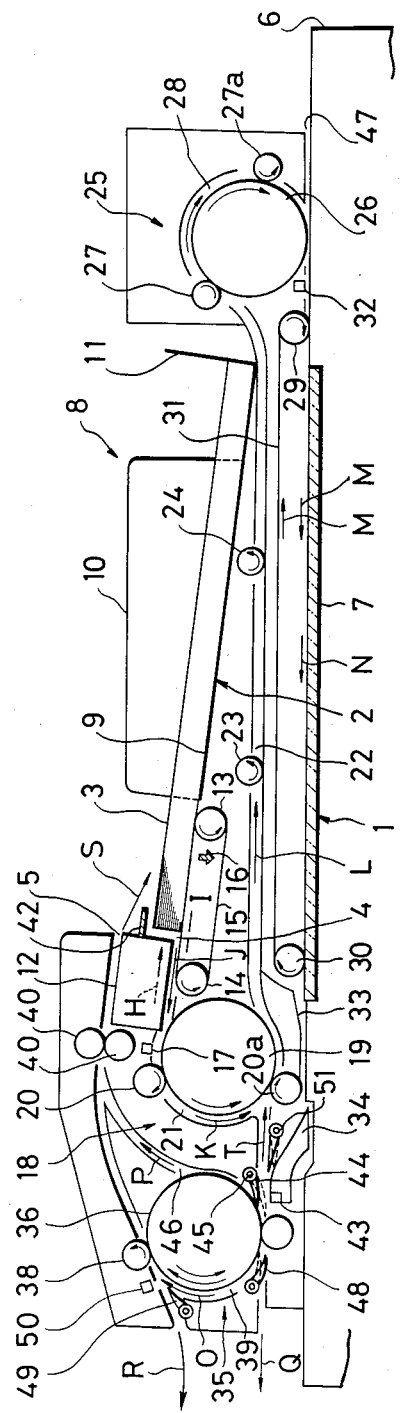
FIG. 5 is a sectional view of the document conveying system comprising one embodiment of the invention.

FIG. 5 shows one embodiment of the document conveying system according to the invention, in which the document conveying system generally designated by the reference numeral 8 is located above a main body 6 of the copying apparatus and comprises a document storage section 2 located above a contact glass member 7 serving as a document illuminating section 2.

As shown, the document storage section 2 comprises a tilting document tray 9 having a rear end (on the right in FIG. 5) lower in level than a front end (on the left in FIG. 5) for supporting a stack of documents 3 thereon.

The documents 3 which are stacked on the document tray 9 with surfaces having images to be copied facing downwardly are positioned by a pair of side guides 10 (only one is shown in FIG. 5) located on opposite sides of the document tray 9 and an end plate 11 located on the rear end of the document tray 9. The side guides 10 are supported for movement in a direction perpendicular to the plane of FIG. 5 and the end plate 11 is supported for movement leftwardly and rightwardly in the plane of FIG. 5, so that they can assume suitable positions conforming to the size of the documents 3 supported on the document tray 9. Thus, it is possible to readily place a stack of documents that can be copied on the document tray 9 in such a manner that they are aligned at their leading end (left end) simultaneously as they are set on the document tray 9, regardless of their size.

In feeding a document from the stack of documents 3 on the document tray 9, an air blast supply section 12 located in front of the document tray 9 and spaced apart from the leading end of the documents 3 by a small distance is rendered operative to produce an air blast which is directed to the leading end of the documents 3 as indicated by an arrow H to shuffle the documents 3 and prevent more than one document to be fed from the document tray 9 at a time. A document feeding belt 15 trained over a pair of pulleys 13 and 14 and located in a position in which it does not interfere with the document tray 9 is driven for operation in a direction indicated by an arrow I so as to feed the lower-most document of the stack of documents 3 on the document tray 9 leftwardly in FIG. 5 as indicated by an arrow J. The lowermost document 3 is drawn downwardly by suction and attracted to the upper run of the belt 15 as a pneumatic drawing section is rendered operative. Thus, as the belt 15 is driven for rotation, the lowermost document 3 is fed from the document tray 9. This operation is repeated for all the documents 3 on the document tray 9, so that the documents 3 on the document tray 9 are each fed from the document setting section 1 one after another.

The document 3 fed as described hereinabove from the document tray 9 in the direction of the arrow J through a document feeding port 4 moves below the air blast supply section 12 and is monitored by a sensor 17 which signals that the document 3 has been fed without any trouble. Then, the document 3 reaches first direction altering means 18 which is operative to alter the direction in which the document 3 is conveyed. As shown, the first direction altering means 18 comprises a turn roller 19 driven to rotate counterclockwise and a pair of pinch rollers 20 and 20a maintained in rolling engagement with the turn roller 19, and the document 3 is moved through a first inverting turnaround passageway 21 in the direction of an arrow K while being held between the outer periphery of the turn roller 19 and the outer peripheries of the pinch rollers 20 and 20a. Thus, the direction in which the document 3 is conveyed is altered and the document 3 is conveyed through a horizontal passageway 22 in the direction of an arrow L from one end (left end) of the contact glass member 7 toward an opposite end (right end) thereof. The numerals 23 and 24 designate rollers located on the horizontal passageway 22 for conveying the document 3.

The document 3 conveyed through the passageway 22 on the contact glass member 7 reaches second direction altering means 25 which alters by 180 degrees the direction in which the document 3 is conveyed. The second direction altering means 25 comprises a turn roller 26 driven to rotate clockwise, and a pair of pinch rollers 27 and 27a maintained in rolling engagement with the turn roller 26. The document 3 held between the peripheries of the pinch rollers 27 and 27a and the periphery of the turn roller 26 is moved through a second inverting turnaround passageway 28 and has the direction of its movement altered during its movement through the turnaround passageway 28. Thus, the document 3 is now moved from the opposite end of the contact glass member 7 toward the one end thereof.

An endless conveyor belt 31 trained over a pair of conveyor belt pulleys 29 and 30 and driven for movement in the direction of an arrow M is located on the contact glass member 7. The document 3 having had the direction of its movement altered by the second direction altering means 25 is conveyed by the conveyor belt 31 in the direction of an arrow N on the contact glass member 7. A force of friction acting between the document 3 and contact glass member 7 is smaller than a force of friction acting between the document 3 and conveyor belt 31, so that the document 3 is conveyed in the direction of the arrow N in synchronism with the movement of the conveyor belt 31.

A sensor 32 is located between the second direction altering means 25 and conveyor belt 31. As the trailing end of the document 3 passes by the sensor 32, the sensor 32 actuates pulse generating means, not shown, so that the number of pulses corresponding to a predetermined distance the document 3 is to be conveyed by the conveyor belt 31 is counted. Thereafter, a control, not shown, is actuated to stop the rotation of the pulleys 28 and 29, to render the conveyor belt 31 inoperative and allow the document 3 to stop in a predetermined position on the contact glass member 7 in such a manner that the surface of the document 3 having the image to be copied is kept in contact with the top surface of the contact glass member 7. A light source, not shown, located beneath the contact glass member 7 is rendered operative to illuminatingly scan the surface of the document 3 supporting the image to be copied, to allow a known image forming operation to be performed.

After the document 3 has been illuminated by the light source, the control produces a conveyance starting signal which drives the conveyor belt 31 and moves same in the direction of the arrow M, so that the document 3 is released from engagement with the top surface of the contact glass member 7 and moved below a guide plate 33. The document 3 is then picked up by a pickup guide 34 and held between the peripheries of a turn roller 36 and a pinch roller 38 in moving through a third inverting turnaround passageway 39. The turn roller 36 is driven to rotate clockwise and cooperates with the pinch roller 38 to constitute third direction altering means 35. The document 3 has the direction of its movement altered as indicated by an arrow O while moving through the inverting turnaround passageway 39. Then, the document 3 is ejected by a pair of document ejection rollers 40 onto the document tray 9, so that the document 3 is placed directly on the document tray 9 or on the stack of documents 3 thereon as indicated by an arrow S through a document return port 5. The document return port 5 is located on the same side as the document feeding port 4 and at a higher level than the document feeding port 4 or the topmost document of the stack of documents 3 on the document tray 9. When there is a stack of documents 3 on the document tray 9 at the time the document 3 that has been illuminated in the document illuminating section 1 is returned to the tray 9, the trailing end portion of the returned document 3 is placed on a ledge 42 extending from the return port 5 into the tray 9 or a document separating member 42 located in the document storage section 2, so that the document 3 returned to the document tray 9 after being illuminated can be separated from the documents 3 yet to be illuminated.

The document 3 returned to the document tray 9 after being illuminated is placed on the document tray 9 such that its position is reversed from the position in which it was initially set on the document storage section 2. Stated differently, the returned document 3 has the surface thereof which supports the copied image face upwardly. Thus, when the copying apparatus is of a type which forms images on both surfaces of a copy sheet, it is possible to copy an image supported on an opposite surface of the document 3 that has had the image supported on one surface thereof copied already merely by feeding the returned document 3 again to the contact glass member 7 from the document tray 9 without adjusting the order of pages of the document 3. The documents 3 placed in a stack on the document tray 9 again after being illuminated in the document illuminating section 1 differ in position from the documents 3 initially set on the document tray 9, although the order of their pages remains unchanged. Since it is desired to arrange the documents in the same manner as described hereinabove in a final step of handling the documents, the document conveying mode shown and described hereinabove is selected.

When it is desired to arrange the documents 3 returned to the document tray 9 after being illuminated in the document illuminating section 1 in the same manner as they were initially set on the document tray 9, each document 3 is conveyed as follows. Until the document 3 reaches the inverting turnaround passageway 39 after being illuminated, the document 3 is conveyed in the same manner as described hereinabove. However, when the document 3 entering the inverting turnaround passageway 39 reaches a position in which its trailing end passes by a sensor 43, a passageway switching claw 44 pivotally moves slightly about a support shaft 45 into a phantom line position, and at the same time the turn roller 36 rotating clockwise begins to rotate counterclockwise. Thus, the document 3 is conveyed through a non-inverting turnaround passageway 46 in the direction of an arrow P with the traling end of the document 3 now serving as a leading end thereof after the document 3 has entered the non-inverting turnaround passageway 46. The document 3 thus conveyed through the non-inverting turnaround passageway 46 is ejected onto the document tray 9 by the pair of document rejection rollers 40 through the document return port 5. The document 3 conveyed through the non-inverting turnaround passageway 46 is not turned upside down by the turn roller 36, so that the document 3 is placed on the document tray 9 is a position in which the surface supporting the copied image faces downwardly in the same manner as the document 3 was initially set on the document tray 9. So long as a set of documents is placed on the document tray 9 in proper order of pages, the set of documents can be placed on the document tray 9 with their pages in proper order after being illuminated in the document illuminating section 1.

In the document conveying mode in which the document is conveyed through the inverting turnaround passageway 36 and in the document conveying mode in which it is conveyed through the non-inverting turn-around passageway 46, it is possible to obtain a predetermined number of sets of duplicates of one set of documents with pages in proper order after the documents are each conveyed through a predetermined series of passageways by feeding the documents from the document tray 9 after they are stacked on the tray 9 again and again. In the embodiment of the document conveying system shown in FIG. 5, each document is conveyed in such a manner that, until the document is conveyed from the document storage section 2 to the document illuminating section 1 and released from the document illuminating section 1, the document is conveyed in such a manner that the same end serves as a leading end, irrespective of the mode in which the document is conveyed. After the document is illuminated in the document illuminating section 1, the document is conveyed while being inverted or conveyed without being inverted, depending on the mode in which it is conveyed. Thus, it is possible to arrange the documents in any desired position when the documents are handled in a final step of copying operation. Therefore, it is not necessary to perform a document feeding operation for the sole purpose of adjusting the manner in which the documents are arranged ultimately after a copying operation has been performed thereon.

A document feeding port 47 located on the right side of the second direction altering means 25 shown in FIG. 5 is used for the operator to feed one document after another manually when it is necessary to do so, such as when it is desired to copy some documents urgently while a set of documents on the document tray 9 is being copied, when it is desired to copy some special documents or when document feeding is performed semiautomatically. A switch claw 48 located on the lower left side of the turning roller 36 shown in FIG. 5 is operative to direct the document 3 in such a manner that it is directly ejected out of the apparatus as indicated by an arrow Q without being conveyed to the document tray 9. When the switch claw 48 is rendered operative, it moves to a phantom line position in FIG. 5. A switch claw 49 located on the upper left side of the turn roller 36 moves to a phantom line position as the trailing end of the document 3 conveyed through the inverting turnaround passageway 39 is sensed by a sensor 50 and causes the turn roller 36 to rotate counterclockwise so as to eject the document 3 in the direction of an arrow R. A switch claw 51 located on the lower right side of the turn roller 36 causes the turn roller 36 to rotate counterclockwise as it moves to a phantom line position, so that the document 3 about to enter the inverting turnaround passageway 39 is conveyed in an opposite direction or in a direction indicated by an arrow T and moves into the horizontal passageway 22 in which it is conveyed in the direction of an arrow L onto the contact glass member 7. At this time, the document 3 is brought into contact with the surface of the contact glass member 7 at a surface thereof which is opposite the surface previously illuminated in the document illuminating position 1. After being illuminated again, the document 3 is conveyed through any one of the passageways described hereinabove as desired, to be ejected onto the document tray 9 or from the apparatus. By conveying the documents 3 as described hereinabove, it is possible to copy both sides of each document one by one.

While the document conveying system shown in FIG. 5 has been described as being incorporated in an electrophotographic copying apparatus, it is to be understood that the system can be incorporated in any other other image forming apparatus, such as a printer, without departing from the scope of the invention.

FIG. 6 shows an automatic copying apparatus 60 suitable for copying both surfaces of each document incorporating therein a second embodiment of the document conveying system according to the invention. The copying apparatus 60 comprises a main body 6, and a finisher 61 connected to one end of the main body 6, in addition to the document conveying system 8 located above the main body 6.

Located on the top surface of the main body 6 is the contact glass member 7 to which a document D is conveyed by the document conveying system 8 and illuminatingly scanned by an illumination exposing system 1 located beneath the contact glass member 7. Located below the illumination exposing system 1 is an endless photosensitive belt 62 which travels in the shown direction and is exposed to an optical image of the document D formed by light emitted by the illumination exposing system 1 so as to form on the photosensitive belt 62 an electrostatic latent image of a charge distribution corresponding to the image information carried by the document D. A developing device 63 is located in the vicinity of the photosensitive belt 62 for developing the electrostatic latent image formed on the photosensitive belt 62 into a positive image by means of a toner. Meanwhile, a plurality of sheet feeding devices 64 each for supporting sheets P of different sizes are located in the main body 6. Each sheet P is fed from the sheet feeding devices 64 through a sheet feeding passageway 65 to a transfer-printing section 66 located adjacent a vertical run of the photosensitive belt 62 so that a toner image is pruinted on the sheet P by the action of a transfer-printing charger 67. Another charger 68 and a cleaning device 69 are located in the vicinity of the photosensitive belt 62.

A fixing section 70 for fixing the toner image on the sheet P is located along a sheet passageway 50a disposed on the downstream side of the sheet feeding passageway 50, and a document inverting section 71 is connected to the passageway 50a in a position disposed downstream of the fixing section 70 so as to selectively introduce the sheet P into the document inverting section 71 by a switchback action to turn it upside down. A plurality of rollers 72 for regulating the direction of movement of the sheet P which are capable of varying the positions in which they are brought into contact with each other are located at the entrance to the document inverting section 71.

A switch claw 73 is located adjacent the rollers 72 in a position opposite the entrance to the document inverting section 71 and movable between a position in which it allows the sheet P to move to the passageway 65 for returning the sheet P to the sheet feeding devices 64 and a position in which it allows the sheet P to be conveyed to a sheet ejecting tray 74. Another switch claw 75 is located in a passageway 65b for conveying the sheet P to the sheet ejecting tray 74, and a passageway 65c leading to the finisher 61 branches off the passageway 65b. An intermediate tray 76 is located in the vicinity of the sheet feeding devices 64, and still another switch claw 77 is located along the passageway 65c leading to the finisher 61, and a passageway 65b leading to the intermediate tray 76 branches off the passageway 65c.

The intermediate tray 76 is connected to the document feeding passageway 65 connected to the sheet feeding devices 64.

The finisher 61 comprises a main body 78 having mounted therein a binding tray 79 tilting such that its forward portion (left portion in FIG. 6) is disposed below its rearward portion (right portion in FIG. 6). The sheet P is supplied to the binding tray 79 from the passageway 65c via rollers 80. Elevatingly mounted to the forward end of the binding tray 79 is a stopper 81 which stops the movement of the sheet P as the leading end of the sheet P is brought into abutting engagement therewith. The stopper 81 is actuated by a solenoid 82. Meanwhile, a sheets aligning device 83 for bringing the leading ends of the sheets P supplied to the binding tray 79 into abutting engagement with the stopper 81 is located above the binding tray 79. A stapler 84 for binding the sheets P with a staple is also located above the binding tray 79. Sheet ejecting rollers 85 are located in front of the stopper 81 for ejecting onto a stacker 86 extending sideways from the main body 78 of the finisher 61 a bundle of sheets PB produced on the binding tray 79 by binding the sheets P with a staple. The stacker 81 which is elevatingly mounted gradually moves downwardly as the number of bundles of sheets PB increases.

Turning to the document conveying system 8, it comprises a first document tray 87 and a second document tray 9 located substantially immediately above the contact glass member 7. The first document tray 87 which is disposed above the second document tray 9 is capable of simultaneously supporting a plurality of sets of documents D differing from each other in copying conditions. The documents D are placed on the first document tray 87 in such a manner that side surfaces thereof which are first copied face downwardly. An endless feeding belt 88 is located below a left end portion of the first document tray 87 to feed the lowermost document of the stack of documents D on the first document tray 87. The document D fed by the feeding belt 88 from the first document tray 87 is led to an introducing passageway 89 which is provided with fourth direction altering means 90 and connected at its end to second direction altering means 28 located in a circulating passageway 91 subsequently to be described. A mark reader 92 is located in the introducing passageway 89 in a position close to the first document tray 87 to read out a mark on each mark sheet, not shown.

The second document tray 9 which is interposed between the first document tray 87 and contact glass member 7 is intended to receive each set of documents D from the first document tray 87 to perform recycle copying. An endless feeding belt 15 is located below a left end portion of the second document tray 9 to feed a lowermost document of the stack of documents D on the second document tray 9 into the circulating passageway 91. The circulating passageway 91 includes a supply-side passageway 93 connected to the contact glass member 7 via first direction altering means 18 subsequently to be described and the second direction altering means 28 described hereinabove. An endless conveyor belt 31 for conveying the document D is located in a portion of the supply-side passageway 93 which is located above the contact glass member 7 and maintained in pressing contact therewith. The endless conveyor belt 31 performs the function of conveying the document D located in a portion of the supply-side passageway 93 which is interposed between the first and second direction altering means 18 and 28, in addition to conveying the document D located in the portion of the supply-side passageway 93 located above the contact glass member 7. A return passageway 94 for returning the document D on the contact glass member 7 to the second document tray 9 extends from a left end of the contact glass member 7 to a point above a left end of the second document tray 9. The return passageway 94 which is curved constitutes third direction altering means 35'. In this embodiment, the document D entering the second document tray 9 from its left end leaves the second document tray 9 from its left end when the document D is led to the contact glass member 7 again. This arrangement is adopted to enable the documents D of different sizes to be smoothly fed from the second document tray 9.

A switch claw 95 is located midway in the return passageway 94 of the circulating passageway 91 and movable between a position in which it allows the document D to be returned to the second document tray 9 and a position in which it introduces the document D into a branch passageway 96 branching from the return passageway 94. The branch passageway 96 which has mounted therein a pair of conveyor rollers 97 capable of rotating in the normal and reverse directions is bifurcated into an ejection passageway 99 for ejecting the document D onto an ejection tray 98 and an inverting passageway 100 for inverting the document D. A switch claw 101 is located in the junction of the two passageways 99 and 100 and movable between a position in which it introduces the document D into the ejection passageway 99 and a position in which it introduces the document D into the inverting passageway 100. A pair of conveyor rollers 102 capable of rotating in the normal and reverse directions are located in the inverting passageway 100, and a sensor 103 for sensing the trailing end of the document D introduced into the inverting passageway 100 is located in the branch passageway 96. As the sensor 103 senses the trailing end of the document D, the two pairs of conveyor rollers 97 and 102 are moved in the reverse direction to remove the document D from the inverting passageway 100. A bypass passageway 104 for returning the document D from the inverting passageway 100 to the second document tray 9 connects the branch passageway 96 to the return passageway 94, and a switch claw 105 is located in the junction of the bypass passageway 104 and branch passageway 96 and movable between a position in which it allows the document D to be returned from the inverting passageway 100 to the branch passageway 96 and a position in which it introduces the document D from the inverting passageway 100 into the bypass passageway 104. Another bypass passageway 106 connects the return passageway 94 to the portion of the supply-side passageway 93 interposed between the first and second direction altering means 18 and 28 so as to supply the document D from the inverting passageway 100 directly to the contact glass member 7 without staying temporarily on the second document tray 9. By this arrangement, each document D can have its both side surfaces immediately copied by eliminating the need to stay on the second document tray 9, thereby eliminating the risk that jamming of the documents D might occur because they pass through the second document tray 9.

Operation of the embodiment shown in FIG. 6 will now be described. A plurality of sets of documents D to be copied are stacked on the first document tray 87 with the side surface of each document D to be first copied facing downwardly. A mark sheet, now shown, giving information on the copying conditions is placed below the lowermost document D of each set to indicate the presence of different sets. Depressing a copying button, not shown, actuates the feeding belt 88 which first feeds the mark sheet from the first document tray 88 to the introducing passageway 89, and the copying conditions indicated by the mark sheet are read by the mark reader 92 and stored in a memory, not shown. The information stored in the memory is processed by a processor to bring various parts of the copying apparatus to positions in which they satisfy the copying conditions. When some parts of the copying apparatus are unable to satisfy the copying conditions, this is indicated by an indication device.

When all the copying conditions are satisfied, the mark sheet moves from the introducing passageway 89 to the contact glass member 7, from which it is ejected through the return passageway 94, branch passageway 96 and ejection passageway 99 onto the ejection tray 98.

Then, the documents D to be copied are fed from the first document tray 87 one after another and stop on the contact glass member 7 where each document D is illuminatingly scanned by an exposing system in the illumination exposing section 1, and the document D illuminated is introduced from the return passageway 94 into the inverting passageway 100 before being set on the second document tray 9. When the document D is set on the second document tray 9, the side surface of the document D that has already been copied faces downwardly. When the document D is not one of a set of documents D, it is conveyed through the same path as the mark sheet described hereinabove and ejected onto the ejection tray 98.

The documents D set on the second document tray 9 belong to the set whose copying conditions are indicated by the mark sheet referred to hereinabove. To set on the second document tray 9 only those documents D which belong to the set of documents D of the particular copying conditions, another mark sheet which might be sensed by the mark reader 92 is prevented from being conveyed. Another sensor may be provided to count the number of documents D that have passed by the sensor (not shown). Thus, by comparing the number of documents D monitored by the sensor with the number of documents conveyed in circulation each time the document is circulated, it is possible to prevent more than one document from being conveyed at a time.

Each document D set on the second document tray 9 is fed by the feeding belt 15 to the contact glass member 7 through the supply-side passageway 93, and introduced into the return passageway 94 after being scanned by the exposing system in the illumination exposing section 1, to be returned to the second document tray 9. After a predetermined number of documents D are illuminatingly scanned one by one, they stand by on the second document tray 9. When the documents D support image information on either side surface of each document D and both surfaces copying mode is selected, each document D is introduced into the inverting passageway 100 after having one surface thereof illuminatingly scanned and led to the supply-side passageway 93 via the bypass passageway 106. After an opposite surface of the document D is illuminatingly scanned, it is directly returned to the second document tray 9 via the return passageway 94 without being introduced into the inverting passageway 100, to be set on the second document tray 9. In the both surfaces copying mode, the document D is moved through the path referred to hereinabove when it is initially fed from the first document tray 87. When the sheets P are supplied, conveyed and ejected as scheduled, the document D on the second document tray 9 is ejected onto the ejection tray 98 after moved on the contact glass member 7 without being illuminatingly scanned.

When all the documents D of one set have been copied, a mark sheet giving information on the copying conditions of the next following set of documents D is fed from the first document tray 87, and the copying conditions of the next following set are read by the mark reader 92. Thus, an operation of copying the documents D of this set is started.

By placing a mark sheet below the lowermost document D of each set of documents D, it is possible to have a plurality of sets of documents D of different copying conditions copied by a copying apparatus by resetting the copying apparatus each time the copying operation shifts from one set of documents D to another. This eliminates the need for the operator to be bound to the copying apparatus 60 for a prolonged period of time, thereby enabling labor to be saved. The use of mark sheets enables the documents D to be deficitely separated from one set to another, so that the occurrence of trouble involving the feeding of more than one document D at a time can be avoided.

Detailed description of the movement of the sheets P shall be omitted, because it does not form a part of the invention. Although mark sheets have been described as being used in the embodiment shown in FIG. 6, the use of mark sheets may be replaced by the use of a key which would be operated by the operator to successively store information on copying conditions and the number of documents of each set in the memory.

What is claimed is:

1. A document conveying system for use with a document illuminating section, comprising:
   a document storage section which is located above, and at least partly overlaps, the document illuminating section, said document storage section being capable of supporting a plurality of documents therein and having a first document feeding port and a document return port, said ports being located at the same side of the document storage section;
   means for feeding documents from the document storage section through said first document feeding port;
   first direction altering means arranged between said document feeding port and said document illuminating section for altering the direction in which a document fed from said document storage section through said first document feeding port is conveyed so that it will be conveyed above said document illuminating section from one end thereof toward an opposite end thereof;
   second direction altering means arranged between said first direction altering means and said document illuminating section for altering the direction in which the document is conveyed so that it will be conveyed again along the document illuminating section from the opposite end thereof toward the one end thereof;
   third direction altering means for altering the direction in which the document is conveyed after being illuminated at the document illuminating section so that it will face said document return port located on the same side as the first document feeding port and be returned to the document storage section;
   a third passageway extending from the third direction altering means to the document illuminating section, and a fourth passageway branching from said third passageway for returning the document from the third direction altering means to the document storage section, and a second switch claw located at the junction of the third and fourth passageways for switching the direction of movement of the document that has had the direction of its movement altered by the third direction altering means.

2. A document conveying system for use with a document illuminating section, comprising:
   a document storage section which is located above, and at least partly overlaps, the document illuminating section, said document storage section being capable of supporting a plurality of documents therein and having a first document feeding port and a document return port, said ports being located at the same side of the document storage section;
   means for feeding documents from the document storage section through said first document feeding port;
   first direction altering means arranged between said document feeding port and said document illuminating section for altering the direction in which a document fed from said document storage section through said first document feeding port is conveyed so that it will be conveyed above said document illuminating section from one end thereof toward an opposite end thereof;
   second direction altering means arranged between said first direction altering means and said document illuminating section for altering the direction in which the document is conveyed so that it will be conveyed again along the document illuminating section from the opposite end thereof toward the one end thereof;
   third direction altering means for altering the direction in which the document is conveyed after being illuminated at the document illuminating section so that it will face said document return port located on the same side as the first document feeding port and be returned to the document storage section;
   a first document ejecting port, a first passageway leading from said third direction altering means to said document storage section, a second passageway which branches from said first passageway and is connected to said first document ejecting port, and a first switch claw located at the junction of the first and second passageways for switching the direction of movement of the document that has had the direction of its movement altered by the third direction altering means; and
   a third passageway extending from the third direction altering means to the document illuminating section, and a fourth passageway branching from said third passageway for returning the document from the third direction altering means to the document storage section, and a second switch claw located at the junction of the third and fourth passageways for switching the direction of movement of the document that has had the direction of its movement altered by the third direction altering means.

3. A document conveying system for use with a document illuminating section, comprising:

a document storage section which is located above, and at least partly overlaps, the document illuminating section, said document storage section being capable of supporting a plurality of documents therein and having a first document feeding port and a document return port, said ports being located at the same side of the document storage section;

means for feeding documents from the document storage section through said first document feeding port;

first direction altering means arranged between said document feeding port and said document illuminating section for altering the direction in which a document fed from said document storage section through said first document feeding port is conveyed so that it will be conveyed above said document illuminating section from one end thereof toward an opposite end thereof;

second direction altering means arranged between said first direction altering means and said document illuminating section for altering the direction in which the document is conveyed so that it will be conveyed again along the document illuminating section from the opposite end thereof toward the one end thereof;

third direction altering means for altering the direction in which the document is conveyed after being illuminated at the document illuminating section so that it will face said document return port located on the same side as the first document feeding port and be returned to the document storage section;

a first document ejecting port, a first passageway leading from said third direction altering means to said document storage section, a second passageway which branches from said first passageway and is connected to said first document ejecting port, and a first switch claw located at the junction of the first and second passageways for switching the direction of movement of the document that has had the direction of its movement altered by the third direction altering means;

in which said document return port is located at a higher level than the first document feeding port of the document storage section and the uppermost sheet of the documents supported in the document storage section that have not been illuminated at said illuminating section, said document return port having a ledge extending therefrom for supporting one end portion of the document returned to the document storage section through the document return port; and a third passageway extending from the third direction altering means to the document illuminating section, and a fourth passageway branching from said third passageway for returning the document from the third direction altering means to the document storage section, and a second switch claw located at the junction of the third and fourth passageways for switching the direction of movement of the document that has had the direction of its movement altered by the third direction altering means.

4. A document conveying system for use with a document illuminating section, comprising:

a document storage section which is located above, and at least partly overlaps, the document illuminating section, said document storage section being capable of supporting a plurality of documents therein and having a first document feeding port and a document return port, said ports being located at the same side of the document storage section;

means for feeding documents from the document storage section through said first document feeding port;

first direction altering means arranged between said document feeding port and said document illuminating section for altering the direction in which a document fed from said document storage section through said first document feeding port is conveyed so that it will be conveyed above said document illuminating section from one end thereof toward an opposite end thereof;

second direction altering means arranged between said first direction altering means and said document illuminating section for altering the direction in which the document is conveyed so that it will be conveyed again along the document illuminating section from the opposite end thereof toward the one end thereof;

third direction altering means for altering the direction in which the document is conveyed after being illuminated at the document illuminating section so that it will face said document return port located on the same side as the first document feeding port and be returned to the document storage section;

a first document ejecting port, a first passageway leading from said third direction altering means to said document storage section, a second passageway which branches from said first passageway and is connected to said first document ejecting port, and a first switch claw located at the junction of the first and second passageways for switching the direction of movement of the document that has had the direction of its movement altered by the third direction altering means; and a seventh passageway extending from the third direction altering means to the first direction altering means for returning to the first direction altering means the document conveyed to the third direction altering means from the second direction altering means.

5. A document conveying system for use with a document illuminating section, comprising:

a document storage section which is located above, and at least partly overlaps, the document illuminating section, said document storage section being capable of supporting a plurality of documents therein and having a first document feeding port and a document return port, said ports being located at the same side of the document storage section;

means for feeding documents from the document storage section through said first document feeding port;

first direction altering means arranged between said document feeding port and said document illuminating section for altering the direction in which a document fed from said document storage section through said first document feeding port is conveyed so that it will be conveyed above said document illuminating section from one end thereof toward an opposite end thereof;

second direction altering means arranged between said first direction altering means and said document illuminating section for altering the direction in which the document is conveyed so that it will be conveyed again along the document illuminating section from the opposite end thereof toward the one end thereof;

third direction altering means for altering the direction in which the document is conveyed after being illuminated at the document illuminating section so that it will face said document return port located on the same side as the first document feeding port and be returned to the document storage section;

a first document ejecting port, a first passageway leading from said third direction altering means to said document storage section, a second passageway which branches from said first passageway and is connected to said first document ejecting port, and a first switch claw located at the junction of the first and second passageways for switching the direction of movement of the document that has had the direction of its movement altered by the third direction altering means;

in which said document return port is located at a higher level than the first document feeding port of the document storage section and the uppermost sheet of the documents supported in the document storage section that have not been illuminated at said illuminating section, said document return port having a ledge extending therefrom for supporting one end portion of the document returned to the document storage section through the document return port; and a seventh passageway extending from the third direction altering means to the first direction altering means for returning to the first direction altering means the document conveyed to the third direction altering means from the second direction altering means.

6. A document conveying system as in claim 1, further comprising a first document ejecting port, a second document ejecting port disposed above said first document ejecting port, an ejecting passageway leading from said third direction altering means to said first document ejecting port, a first passageway leading from said third direction altering means to said document storage section, a second passageway which branches from said first passageway and is connected to said second document ejecting port, a first switch claw located at the junction of the ejecting passageway and the first passageway and a second switch claw located at the junction of the first and second passageways for switching the direction of movement of the document in such a manner that the end of the document serving as a leading end when conveyed through the first passageway leading from the third direction altering means to the document storage section serves as a trailing end when conveyed through the second passageway to the ejection port.

7. A document conveying system as in any one of claims 1-5, further comprising another document storage section having a document feeding port and arranged above said document storage section, means for feeding documents from said another document storage section through its document feeding port, fourth direction altering means for altering the direction of the document fed from said second document storage section through its document feeding port, and an eighth passageway connecting the fourth direction altering means to the document illumination means.

8. A system as in any one of claims 1-5 in which the document has a first side and a second side, and including a first path arranged between said first direction altering means and said second direction altering means and above said illuminating section for conveying the document second side down, a second path arranged between said second direction altering means and said third direction altering means along said illuminating section for conveying the document first side down, and an additional path communicating with said first direction altering means for conveying the document which has been illuminated back to the first path, causing it to travel therealong first side down, wherein the document then is again fed along the second path, but this time second side down.

* * * * *